Jan. 7, 1930.  A. MAIRICH  1,742,774
DOUGH DIVIDING MACHINE
Filed March 24, 1927  4 Sheets-Sheet 1
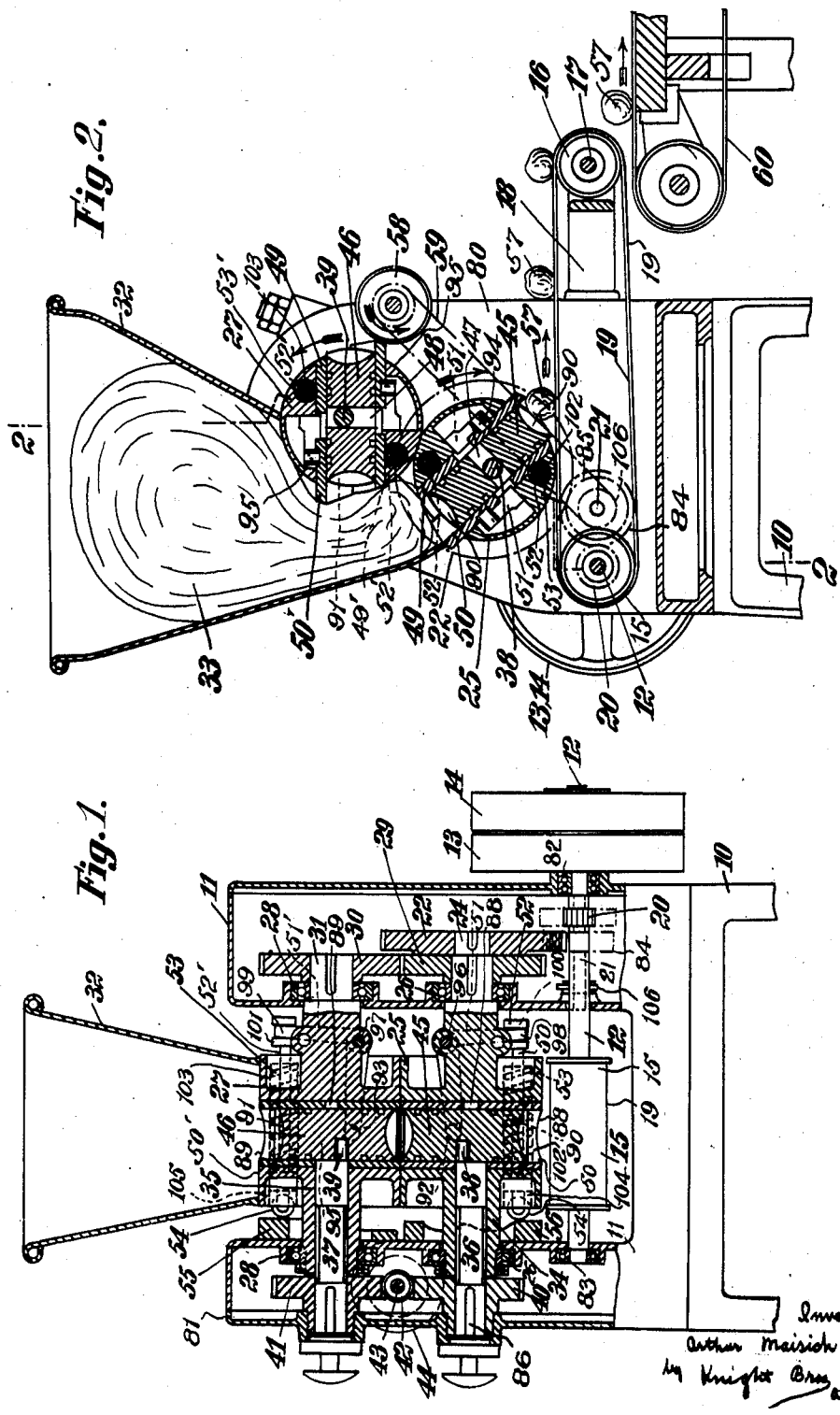

Jan. 7, 1930.  A. MAIRICH  1,742,774
DOUGH DIVIDING MACHINE
Filed March 24, 1927   4 Sheets-Sheet 2
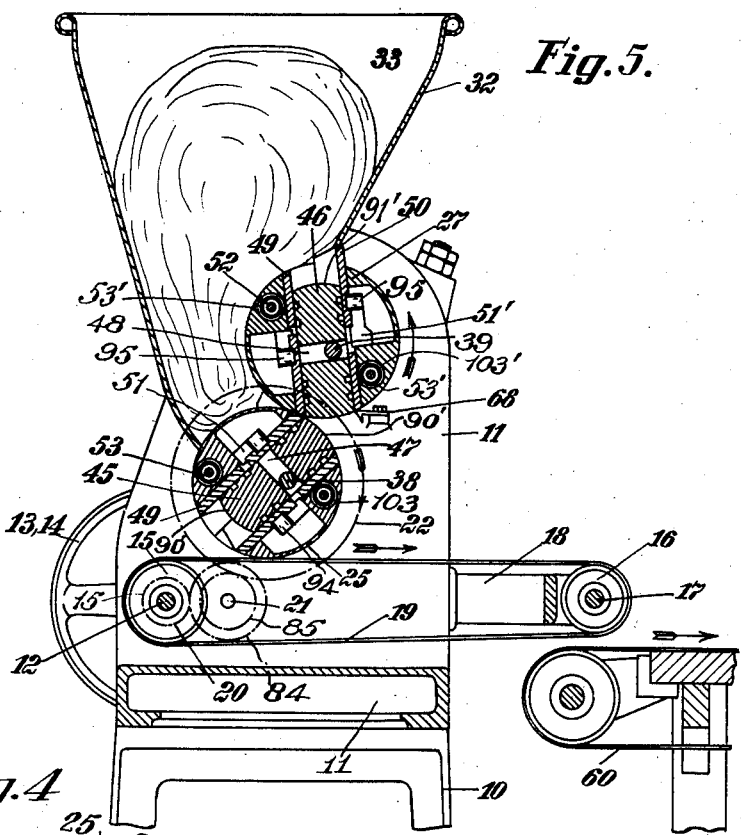
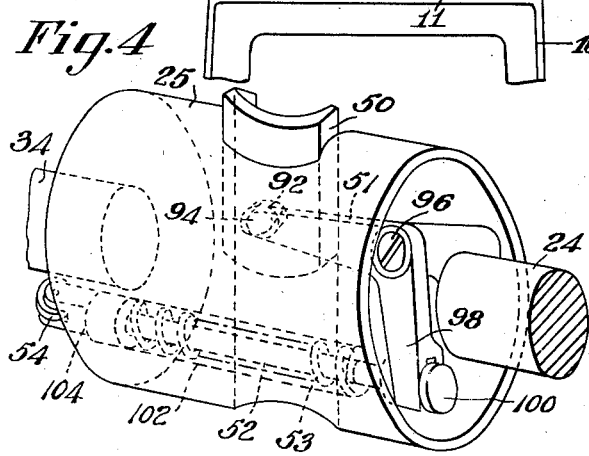
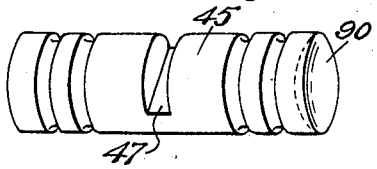
Inventor
Arthur Mairich
by Knight Bros
Attorneys

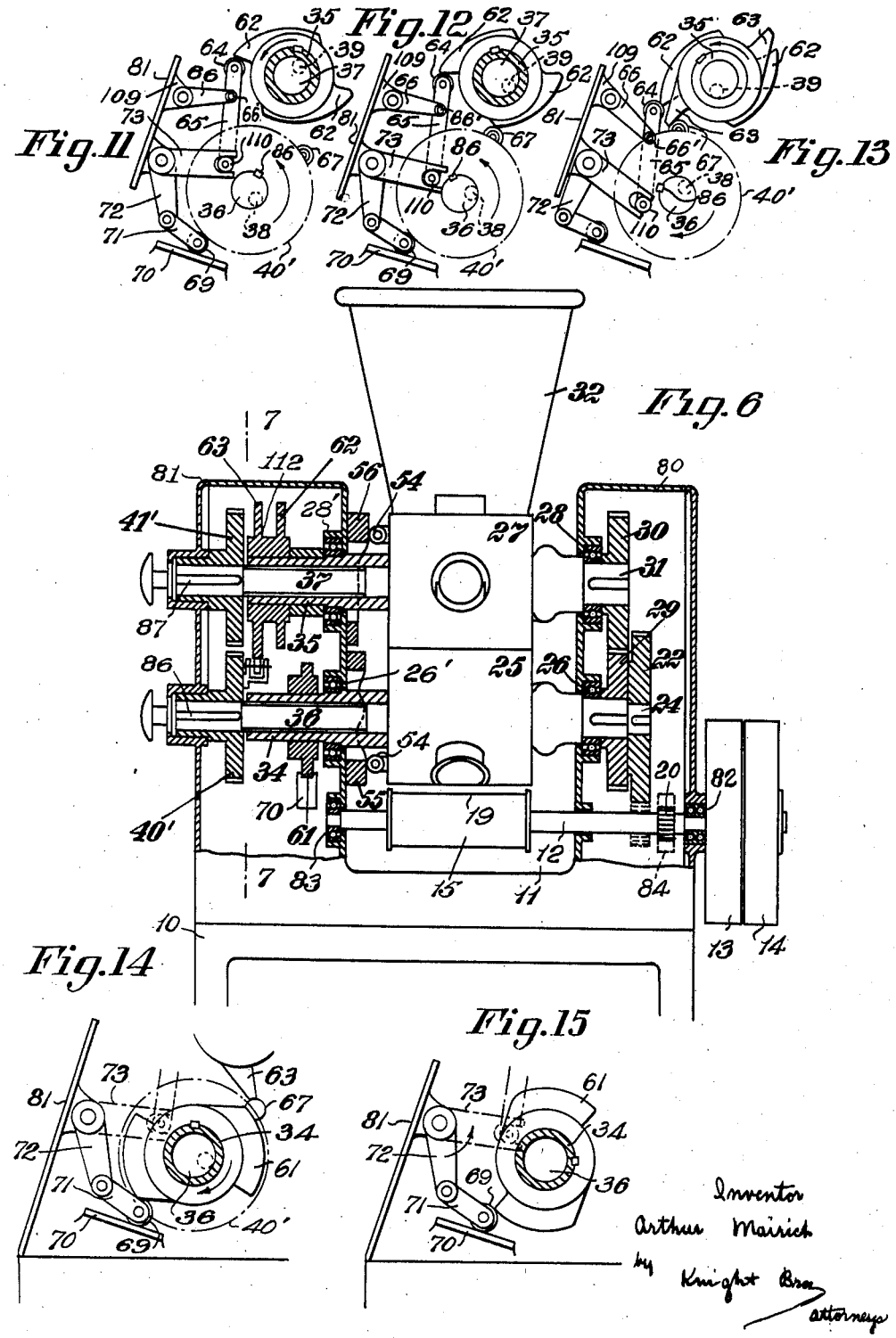

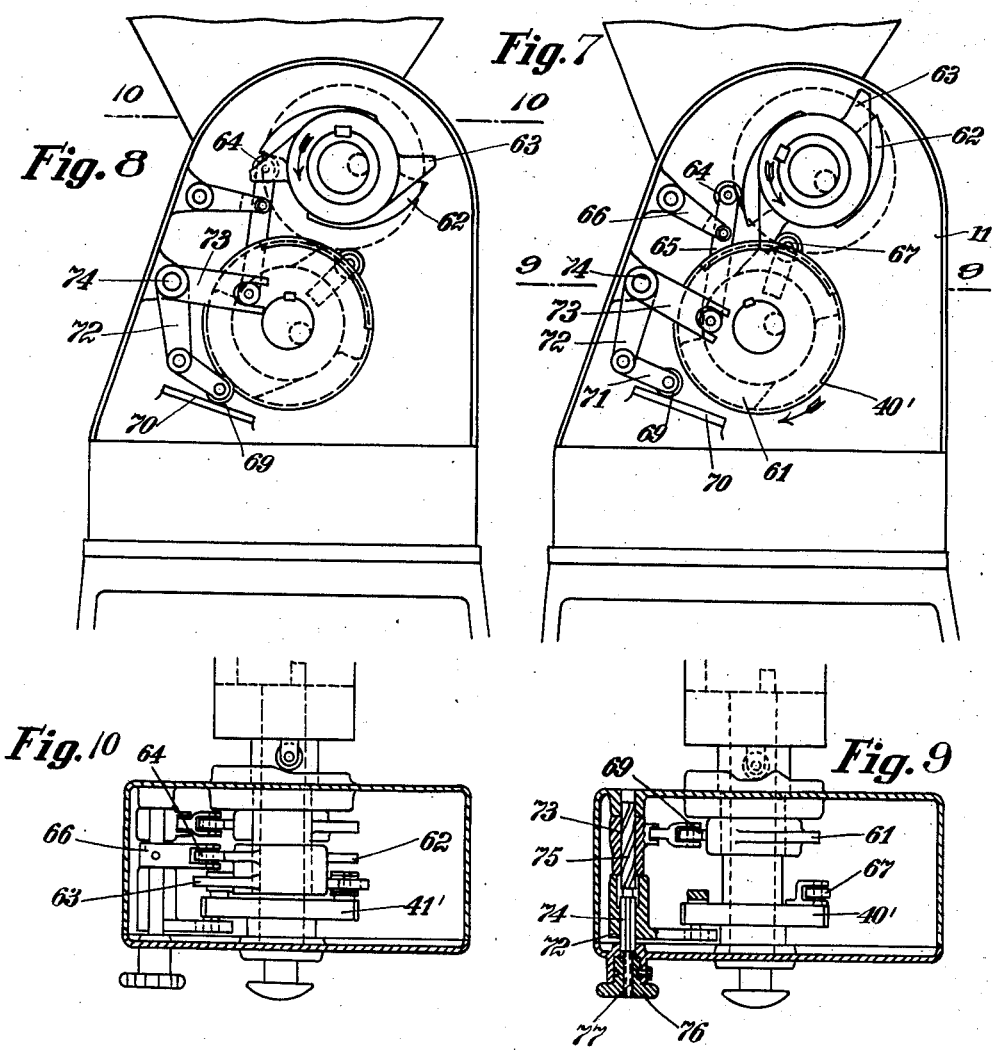

Patented Jan. 7, 1930

1,742,774

UNITED STATES PATENT OFFICE

ARTHUR MAIRICH, OF BERLIN, GERMANY

DOUGH-DIVIDING MACHINE

Application filed March 24, 1927, Serial No. 177,978, and in Germany April 7, 1926.

This invention relates to a dough dividing machine with co-acting dividing rollers arranged on the under side of a dough hopper. In known machines of this kind, the dividing rollers are mounted with their axes in the same horizontal plane.

According to my invention, however, the dividing rollers are so arranged that their axes lie in a vertical or nearly vertical (that is oblique) plane, and in such a position in relation to the dough hopper that the upper roller alone feeds the dough forward.

This novel arrangement renders other members (such as rollers, worms or the like) unnecessary for feeding the dough to the actual dividing-rollers; and it is also of great importance because it protects the cells of the dough, and therefore the fermentation process, from injury. Hence the dough does not become "dead-worked" as easily happened heretofore, especially with wheaten dough.

A feature of my invention is that surfaces (in the form of rollers or belt conveyors) for removing the separated portions of dough, are provided on the delivery side of the dividing rollers, said surfaces co-acting with the dividing scoops of said dividing rollers and moving in the opposite direction thereto.

Additional advantages and features of my invention are hereinafter described with reference to the accompanying drawing, which illustrates the invention, by way of example, in two preferred embodiments.

Fig. 1 is a section (along the line 2—2 of Fig. 2) through the plane of the two dividing rollers in another position of the latter, certain parts being omitted.

Fig. 2 is a vertical section through one embodiment, at right angles to the axes of the two dividing rollers.

Fig. 3 is a perspective view of a plunger slidably arranged in the dividing rollers.

Fig. 4 is a perspective view of a dividing roller showing the means for imparting a movement to the dividing scoops.

Fig. 5 is a vertical section (similar to Fig. 1) through a slightly modified form of the machine.

Fig. 6 is a section at right angles to Fig. 5 but the rollers being shown in elevation for simplicity. The driving mechanism on the right of the figure is the same as that in Fig. 2 whereas the adjusting device on the left is modified.

Figs. 7 and 8 are sections along the broken line 7—7 of Fig. 6, with the working parts in different positions.

Fig. 9 is a partial section (along the line 9—9 of Fig. 7) through one side of the machine (left side in Fig. 6).

Fig. 10 is a corresponding section along the line 10—10 of Fig. 8.

Figs. 11–15 are partial views similar to those shown in Figs. 7 and 8 and in different positions of the cooperating cams and levers, parts having been omitted for the sake of clearness.

In all the figures, similar parts are denoted by the same reference characters.

Referring first more particularly to Figs. 1 and 2, the machine includes a frame 10 having a U-shaped housing 11, having two pillarlike parts 80, 81, the first part 80 of the casing taking up the members of the driving gears, whereas the second pillar 81 contains the adjusting means for varying the size of the dough portions to be described later on. In the lower part of the casing 11 a driving shaft 12 is supported by ball bearings 82, 83 being provided at its outer end with a fixed pulley 13 and a loose pulley 14 by means of which the machine is set in motion from a motor (not shown). 15 is a roller mounted on the shaft 12 between the parts 80, 81 of the casing, and 16 a corresponding roller adapted to turn freely on a shaft 17 journalled in brackets 18 on the housing 11. 19 is a conveyor belt passing over these two rollers.

The shaft 12 carries besides a pinion 20 which, engaging a spur wheel 84 fixed upon a countershaft 21, is supported by the casing 80. A second spur wheel 85 fixed upon the shaft 21 drives a wheel 22 mounted on the journal end 24 of a roller 25.

This roller 25 and a second roller 27 of similar shape and size are provided at one end with the projecting journal ends 24 (referred to above) and 31 respectively projecting into the casing 80 and at the other end with hollow journals 34 and 35 projecting into the part 81 of the casing and they are supported in the walls of these casings by means of ball bearings 26, 28 and 26' and 28' respectively. The distance of the said rollers is equal to the diameter of the rollers so that their surfaces are permanently in contact with each other as clearly shown in the drawings. At the journal end 24 of the roller 25 beside the spur wheel 22 a second spur wheel is fixed. The diameter of the pitch circuit of this gear is equal to the diameter of the shaft 25 and the wheel 29 meshes with the gear wheel 30 of the same diameter on the journal 31 of the roller 27, so that, when the roller 25 is rotated, the roller 27 turns at the same speed in the opposite direction.

A hopper 32 to accommodate the batch of dough 33 is arranged above the rollers 25:27 being supported by projections of the casing parts 80:81 which have been omitted from the drawings for the sake of clearness. The direction of rotation of the shaft 12 is selected so that, when the machine is running, the rollers 25:27 turn in the directions indicated by arrows in Fig. 1 and act upon the dough in such a way as to tend to draw the same in between them.

The hopper 32 is of such shape that a relatively large portion of the surface of the roller 27 acts on the dough 33. At the same time the rollers 25:27 are arranged in such a way that a plane drawn through their rotational axes is vertical or approximately so, and at all events the roller 25 is on a considerably lower level than the roller 27.

Hollow journals 34:35 form bearings for cylindrical bolts or shafts 36:37, provided on their inner ends with eccentrically disposed pins 38:39. The outer ends of the bolts 36:37 projecting beyond the hollow journals 34:35 carry worm wheels 40:41 fixed to their respective shafts by a splined connection 86:87 gearing with a common worm 42 on a cross-shaft 43 which is mounted in the housing part 81. A hand wheel 44 is fixed to the cross shaft 43 outside of the casing part 81. The shaft 43 can be rotated by means of this hand wheel and the rotation is imparted by means of the said worm gear to the shafts 36:37, so that the relative position of the eccentric pins 38:39 may be adjusted.

Each of the two rollers 25:27 is provided with a central bore 88:89 at right angles to its axis. In these bores are arranged plungers 45:46 provided with lateral slots 47:48, in which engage said eccentric pins 38:39 of the shafts 36:37. As can be seen from Figs. 1, 2 and 3, the outer ends 90:91 of the plungers 45:46 are concave.

At each plunger end, there is arranged (between the plunger and the corresponding roller) a divided sleeve composed of two semicylinders, the forward part 49, 49' of which, in the direction of rotation of the rollers 25:27, lies flush with the surface of the roller and is firmly attached thereto, whereas the second part 50, 50' alternately projects beyond the surface of the roller and is drawn back therein, when the machine is in operation. This part 50 may be termed a scoop.

An elongated transverse slot 92:93 in the scoops 50:50' is engaged by a pin or pivot 94:95 at the end of one arm of a crank lever 51:51' (see especially Figs. 2 and 4) rotatably supported at the journals 24:31 of the rollers 25:27 by means of pivots 96:97. The second arm of each of the said crank levers embraces with its forklike end 98:99 a rod 52:52' between the collars 100:101 of the said rods. The rods 52:52' are shiftable in bores 102:103 arranged in the rollers 25:27 parallel to the longitudinal axis of the same and are guided in the bores at the side of the hollow journals 35:37 by pistons 104:105. Compression springs 53:53' arranged in the said bores and acting with one side against the closed end of the bore and with the other against the pistons try to shift the bars 52:52' in the direction to the casing part 81 (to the left in Fig. 2). At the outer side of the pistons 104:105, rolls 54:54' are pivotally supported, which cooperate under the action of the springs 53:53' with cam rings 55:56 at one side of the casing 81.

When dough is placed in the hopper 32, and the dividing rollers 25:27 are set in motion by the aforesaid mechanism, the roller 27 tends to draw the dough, by friction, towards the lower side of the hopper 32 and in the direction of the roller 25 during the rotation of the rollers 25:27, the rollers 54:51 travel on the cams 55:56, so that a to and fro movement is imparted to the bars 52:52'. This to and fro movement causes a corresponding swinging movement of the crank levers 51:51', which in their part cause a to and fro movement of the scoops 50:50' in the bores 88:89. The cams 55:56 are so shaped as to cause the scoops 50:50' to project fully outwards during their passage through the hopper 32 and until their converging outer edges have come into mutual contact to detach a portion of the dough. Upon further rotation of the rollers 25:27, the scoops 50:50' press each other backward into the inner of the bores 88:89 overcoming the tension of the springs 53 acting upon them by means of the crank levers 51:51'. A detached portion of dough remains in the cavity between the concave surfaces 90:91 of the two co-acting plungers 45:46. The volume of the cavity in the moment in which it passes the line of contact of the rollers 25:27 is deciding for the weight of the detached dough portion. By adjusting the relative position of the plungers 45:46, the volume of the cavity can be varied to a certain extent. In the adjustment as shown by Fig. 2 the eccentric pins 38:39 adjusting the plungers and, therefore, the plungers 45:46 themselves have been approached as far as possible. Therefore in this position the cavity between the two pistons is adjusted to its smallest size. If the shafts 36:37 are rotated by means of the hand wheel 44 and the gearing 40:43, then the distance of the pivots 38:39, and therefore the size of the cavity at the moment of the passage through the line of contact, is increased, and therefore the detached dough portion will be increased as well.

During the further movement of the rollers the detached portion of the dough 57 is released, and is carried away out of the machine by the belt conveyor 19. If, on issuing from the rollers, this dough should stick to the lower roller 25 and the plunger 45, it is subjected to a rolling movement by the combined action of the oppositely moving belt 19 and scoop 50, and is thereby compressed. In the event of it sticking to the upper scoop 50′, it comes in contact with a roller 58 upon a shaft 108, mounted in the housing parts 80:81 and turned, by a chain drive 106:59:107 actuated by the countershaft 21, said roller 58 being thus rotated in the same direction as the upper dividing roller 27 and adapted by its arrangement to dislodge the dough from the scoop 50′ of the upper roller 27, so that the dough portion is compressed and then thrown upon the conveyor 19. In any event, the portions of dough 57 are carried away by the belt conveyor, having been preliminarily treated in the described manner between the oppositely moving surfaces of pistons and scoops and the conveyor band 19 or roller 58 respectively, and can be transported further in any desired manner, for example, by means of a belt conveyor 60, as shown in Fig. 1.

Although the machine described above is very suitable for stiff dough, the risk may arise, in the case of soft dough, that the dough will stick to the concave ends 88:89 of the two co-acting plungers 45:46, so that it tears apart in issuing from the rollers. This risk is obviated in the embodiment, according to Figs. 3–8, inasmuch as the plunger ends 90′:91′ have a convex curvature of such shape, and are moved in such a way, that they coincide exactly with the cylindrical surface of the rollers 25:27 at the moment of parting with the dough.

The driving mechanism of the rollers, the arrangement of the hopper and the relative disposition of the rollers, are exactly the same as in the embodiment according to Figs. 1 and 2 and these parts, therefore, need no further description. The scoops 50:50′ (it may be constructed exactly as shown in Figs. 1 and 2) are also actutated in the same way, and consequently their driving mechanism is merely indicated.

On the other hand, the movement of the plungers 45:46, which again are provided with lateral slots for the engagement of the eccentric pins 38:39, is effected in the following special manner, namely, that a specific movement is imparted to the pins 38:39 which, in the first constructional form, are only rotated when the machine is to be adjusted for delivering dough portions of different size, during each revolution of the rollers 25:27, and increases the relative movement between the rollers and plungers and also the velocity of that movement.

At the outer ends of the shafts 36:37, supported as before in the hollow journals 34:35, meshing spur wheels 40′:41′ have been connected by a splined connection 86:87 with their respective shafts. At the side of the gear 40′ a bar 65 has been pivotally attached by means of a bolt 65′, the said bar 65 being provided at its free end with an anti-friction roller 64. The bar is constrained by means of a link 66 pivotally connected to it at the point 66′ and rotatably supported by the casing part 80 by means of a bracket 109. The bolt 65′ penetrates the gear 40′ and supports at the other side of the said gear an anti-friction roller 110. Besides, at the inner side of the gear 41, a bracket 111 has been fixed supporting a second anti-friction roller 67.

Upon the hollow pivot 35 of the upper dough dividing roller 27, a cam member 112 has been fixed having two cam discs 62:63 arranged in different planes, one disc cooperating with the said rollers 64, whereas the other 63 cooperates with the roller 67.

The roller 110 is embraced by the forklike end of a lever arm 73, being supported by means of a spindle 74 in the casing 81. A second lever arm 72 is arranged upon the same spindle 74, which arm is provided at its free end with a link 71 carrying an anti-friction roller 69 at its other end, which is running on a fixed track 70. By any suitable means the angle enclosed between the two arms 72:73 may be altered for varying the to and fro movement of the plungers 45:46. In the constructional form shown in Fig. 9 the preferred form of this adjustment means has been shown. The hub of the lever 73′ of the arm 73 has been connected with the spindle 74 of a key and slot connection 113. The other end of the spindle 74 is provided with a quick thread 75 cooperating with the corresponding female thread in the hub 72′ of the lever arm 72. The spindle 74 is provided at its outer end with a threaded projecting pin 77 engaged by a nut or hand-wheel 76. This nut is provided with a groove 114 engaged by a screw 115 fixed to the casing, so that the nut or wheel 76 can be rotated but not shifted in an axial direction. If it is rotated in one or the other direction it imparts an axial movement to the screw end 77 and to the spindle 74 integral therewith, and by the thread connection between the parts 75 and the hub 72′, the arm 72 is swung in the one or the other direction with its cooperating lever 71 and roller 69.

A cam member 61 has been fixed upon the projecting hollow pivot 35 of the roller 25 and this cam cooperates with the roller 69 at the end of the link 71, being arranged in the plane of the cam disc 61 (see Fig. 9). The operation of these parts for moving the plungers 45:46 is as follows:

When a projection on the cam 62 encounters the roller 64 (Figs. 8, 11 and 12), it forces the bar 65 downward and imparts by means of the pin 110 a counter-clockwise rotation to the gear 40'—(see the arrows in Figs. 11 and 12, which figures are similar in many respects but show the angle between the arms 72, 73 adjusted to different values)—which imparts a corresponding movement in a clockwise direction to its meshing gear 41'. The cooperation of cam 42 and roller 64 therefore causes, as will be easily understood, the wheels 40':41' to turn in the opposite direction to the rotation of the dividing rollers 25:27, the relative positions of the eccentric pins 38:39 and of the pin 65' having been so chosen that in this moment the eccentric pins 38:39 are drawn apart more or less, as may be seen from Figs. 10, 11, and 12 respectively, according to the adjustment of the lever arms 72:73, as will be described later on. Therefore in this moment the faces of the plungers 45:46 approaching the line of contact of the dividing rollers, have been more or less retracted into the rollers. By the described partial rotation of the wheels 40':41' and the corresponding rotation of the eccentric pins 38:39, the plungers are rapidly moved outward, and this movement begins when the axes of the plungers are in alignment, and ceases when the plunger ends are flush with the surfaces of the rollers (as shown in Fig. 5) in the moment in which the cam 62 leaves the roller 69 (see Fig. 13). Directly thereafter, the cam 63 encounters the roller 67, (Figs. 7 and 13) and imparts to the spur wheel 40' a rotary movement in a clockwise direction (see Fig. 13) and inverse rotation to the cooperating wheel 41'. The wheels 40':41' and the rollers 25:27 will turn in the same direction and at the same speed for a certain time as the radii of the points of contact between the projecting cam 63 and the anti-friction roller 67 are rather exactly equal for the period in question thereby causing the plungers to be retained with their surfaces in the position already assumed. During this period the dough is stripped, in known manner, from one of the two plungers 45 or 46 (preferably from the upper plunger 46) by a fixed scraper blade 68 mounted on the machine, this operation being rendered possible by the fact that the plungers are exactly flush with the surface of the rollers during this period.

When the cam 63 has passed off the roller 67 as shown in Fig. 13, the gears 40:41' and cooperating parts have to be returned again into their initial position (Fig. 11) and this return movement is caused by the cooperation of the cam 61 with the roller 69. As will be easily understood from Figs. 13 and 14 the clockwise rotation of the gear 40' has imparted, by means of the pivot 65' and roller 110, a counter-clockwise swinging movement to the arms 72:73 and by this swinging movement the roller 69 has been pushed forward upon the track 70 (to the right in the figures). If now the cam 61 encounters the roller 69, the wheel 40' is, by means of the lever train 71:72:73, again rotated in a clockwise direction until the contact between the cam 61 and the roller 69 ceases (see Fig. 15) and in this moment the bar 65 and its roller 64 have just been returned to the position shown in Fig. 11, whereupon the same play begins again when the next following projection of the cam 62 encounters the roller 64.

The initial relative position of these cooperating parts 64:65 and 62 respectively may be altered by adjusting the angle between the arm 72:73 by the means described above (spindle 74 with cooperating parts).

From Fig. 15 it will be easily understood that the return movement of the roller 69 and its cooperating parts will always stop in the same moment in normal action of the machine, in which the cam 61 glides off the roller 69 independently of the angle enclosed between the arms 72:73. However, if this angle is altered then the arm 73 will be swung more or less in a counter-clockwise direction in this moment and therefore the roller 110 will be lifted in this moment more or less, as may be easily understood from Figs. 11 and 12, showing the adjustment of the lever arms 72:73 to two different positions. In Fig. 11 the angle is larger than in Fig. 12 and therefore the arm 73 has swung or rotated the wheel 40' in the clockwise direction to a larger extent than it has in the position of Fig. 12 and on account of this the distance between the eccentric pivots 38:39 will be larger and therefore the portion of dough enclosed between the plungers 45:46 will be larger in the position shown in Fig. 11 (showing nearly the maximum amount of separation of the eccentric pivots) than they are in Fig. 12, showing approximately the minimum value. It must be understood that a rather slight alteration of the angle between the arms 72:73 will be necessary to adjust the eccentric pins 38:29 into their different positions corresponding to the maximum and minimum dough portions respectively.

Having now fully described my invention, what I claim and desire to secure by Letters Patent is:—

1. In a dough dividing machine, the combination with a feed hopper for the dough, of convergently revolving dividing-rollers mounted one over the other at the bottom of the hopper and provided with cooperating dough-dividing scoops, and means co-acting with the dividing-rollers for rolling the separated lumps of dough.

2. In a dough dividing machine, the combination with a feed hopper for the dough of a pair of cooperating convergently revolving dividing-rollers mounted one over the other at the bottom of the hopper, one of said dividing rolls being oppositely disposed with respect to a wall of said hopper to feed dough into the bite of said rollers, and means co-acting with the other of said dividing-rollers for rolling the separated lumps of dough.

3. In a dough dividing machine, the combination with a feed hopper for the dough of co-acting dividing-rollers superposed obliquely one above the other and opposite to a wall of the hopper forming a converging space for presenting dough to said dividing rollers.

4. In a dough dividing machine, the combination with a feed hopper for the dough of co-acting dividing-rollers superposed one above the other at the bottom of the hopper, said hopper being provided with a dough-guiding wall inclined downwardly toward the peripheral surface of the lower dividing roller, and the upper of said dividing rollers being spaced from and oppositely disposed to said guide wall for feeding the dough downwardly toward the bite of said rollers, and means for revolving the dividing-rollers in opposite directions.

5. In a dough dividing machine, the combination with a feed hopper for the dough of co-acting dividing-rollers superposed for rotation at the bottom of the hopper, means for revolving the dividing-rollers in opposite directions, scoops carried by the dividing-rollers, a belt conveyor arranged below the lower dividing-roller, and means for driving the belt conveyor in a direction opposite to the direction of rotation of the lower dividing-roller.

6. In a dough dividing machine, the combination with a feed hopper for the dough of co-acting dividing-rollers superposed for rotation at the bottom of the hopper, means for revolving the dividing-rollers in opposite directions, scoops carried by the dividing-rollers, a belt conveyor movable below and in an opposite direction to the lower dividing roller, and a roller mounted for rotation in front of the upper dividing-roller.

7. In a dough dividing machine, the combination with a feed hopper for the dough of co-acting dividing-rollers superposed for rotation at the bottom of the hopper, means for revolving the dividing-rollers in opposite directions, scoops carried by the dividing-rollers, a belt conveyor arranged below and movable in a direction opposite to the lower dividing-roller, and a roller mounted in front of and rotatable in the same direction as the upper dividing-roller.

8. In a dough dividing machine, the combination with a feed hopper for the dough of co-acting dividing-rollers superposed for rotation at the bottom of the hopper, means for revolving the dividing-rollers in opposite directions, scoops carried by the dividing-rollers, a belt conveyor arranged below the lower dividing-roller, means for driving the belt conveyor in a direction opposite to the direction of rotation of the lower dividing-roller, a roller mounted in front of the upper dividing-roller, and means for rotating said roller in the same direction as the upper dividing-roller.

In testimony whereof I have affixed my signature.

ARTHUR MAIRICH.